US008127989B2

(12) United States Patent
Choi et al.

(10) Patent No.: US 8,127,989 B2
(45) Date of Patent: Mar. 6, 2012

(54) APPARATUS AND METHOD OF AUTOMATING ARRIVAL AND DEPARTURE PROCEDURES IN AIRPORT

(75) Inventors: Hyung Kyu Choi, Incheon (KR); Yoon Jeong Choi, Seoul (KR); Eun Jeong Seo, Seoul (KR)

(73) Assignee: Inchon International Airport Corporation, Incheon (KR)

( * ) Notice: Subject to any disclaimer, the term of this patent is extended or adjusted under 35 U.S.C. 154(b) by 69 days.

(21) Appl. No.: 12/500,624

(22) Filed: Jul. 10, 2009

(65) Prior Publication Data

US 2010/0308108 A1 Dec. 9, 2010

(30) Foreign Application Priority Data

Jun. 4, 2009 (KR) ........................ 10-2009-0049540

(51) Int. Cl.
*G06K 5/00* (2006.01)
(52) U.S. Cl. ........................................................ 235/382
(58) Field of Classification Search ................... 235/382
See application file for complete search history.

(56) References Cited

U.S. PATENT DOCUMENTS 6,724,304 B2 * 4/2004 Risi ................................ 340/540
2003/0111530 A1 * 6/2003 Iki et al. ......................... 235/382

FOREIGN PATENT DOCUMENTS

KR 1020030091395 A 12/2003

* cited by examiner

*Primary Examiner* — Daniel Hess
*Assistant Examiner* — Rafferty Kelly
(74) *Attorney, Agent, or Firm* — Ladas & Parry LLP

(57) ABSTRACT

The present invention relates to an apparatus and method of automating arrival and departure procedures in an airport, by which the forgery of a passport, the identity of a passport bearer, the arrival or departure permission according to a result of arrival and departure examinations, and the carry-on of prohibited items on the plane are automatically checked. The apparatus for automating arrival and departure procedures according to the present invention includes an exit gate, a departure automation apparatus, and may further include an entrance gate and a scanner. In the apparatus for automating arrival and departure procedures according to the present invention, a departure area entry procedure, a security screening procedure, and a departure examination procedure for departure passengers, which are conventionally performed separately in different areas, may be incorporated in the same area and performed therein.

8 Claims, 14 Drawing Sheets

APPARATUS AND METHOD OF AUTOMATING ARRIVAL AND DEPARTURE PROCEDURES IN AIRPORT

CROSS-REFERENCE TO RELATED PATENT APPLICATIONS

This application claims the benefit of Korean Patent Application No. 10-2009-0049540, filed on Jun. 4, 2009, in the Korean Intellectual Property Office, the disclosure of which is incorporated herein in its entirety by reference.

BACKGROUND OF THE INVENTION

1. Field of the Invention

The present invention relates to an apparatus and method of automating arrival and departure procedures in an airport, and more particularly, to an apparatus and method of automating arrival and departure procedures in an airport, by which the forgery of a passport, the identity of a passport bearer, the arrival or departure permission according to a result of arrival and departure examinations, and the carry-on of prohibited items on the plane are automatically checked.

2. Description of the Related Art

FIG. 1 illustrates a conventional departure area in an airport. Referring to FIG. 1, in the conventional departure area in an airport, a departure area entry procedure 10, a security screening procedure 20, and a departure examination procedure 30 are independently performed in different places, and each of the procedures is controlled by security guards or examiners.

Since the departure area entry procedure 10, the security screening procedure 20, and the departure examination procedure 30 are separately performed, the conventional departure area is highly inefficient. For example, a lot of time is needed merely to enter a departure area. Also, since equipment needed to perform the respective procedures are scattered in different places, it is difficult to maintain or repair the equipment. Further, since a lot of manpower is required to control the procedures, high personnel costs are incurred.

Also, in order to pass the departure area entry procedure 10, the security screening procedure 20, and the departure examination procedure 30, a passenger has to carry a boarding pass in addition to a passport. However, since there is a possibility of the boarding pass being lost, the passenger is inconvenienced in having to pay attention not to lose the boarding pass, as well as the passport.

Also, when the passport or a visa is elaborately forged, it is difficult for immigration officers to screen the forged passport so that illegal pass of the arrival or departure area entry procedure may be possible. Since each procedure is independently performed in a different place, there is a possibility of switching a boarding pass or a passport in a blind spot, for example, a transfer area, in the airport and thus illegally entering a country.

Thus, there is a demand for technology which facilitates identifying a passport bearer, prevents illegal activities in an airport such as switching of a passport or boarding pass, enables passing an arrival or departure area entry procedure without a boarding pass, and reduces examination personnel and required time for the arrival or departure area entry procedure.

SUMMARY OF THE INVENTION

To solve the above and/or other problems, the present invention provides an apparatus and method of automating arrival and departure procedures in an airport, by which a departure area entry procedure, a security screening procedure, and a departure examination procedure that are independently performed in different places are performed in the same place in an automated method.

According to an aspect of the present invention, an apparatus for automating arrival and departure procedures for controlling a bearer of an electronic passport to undergo a security procedure when passing a path includes an exit gate installed at an exit of the path, a departure automation apparatus installed beside the path and generating identity read information and bio read information by reading the electronic passport in which identity information and bio information including a face image of the bearer of the electronic passport are stored, generating image bio information by capturing an image of the face of the bearer of the electronic passport, and generating first result information about forgery of the electronic passport, a departure management portion generating second result information about check-in of the electronic passport bearer by comparing the identity read information and check-in information received from an airline system, generating third result information about the identity of the electronic passport bearer by comparing the bio read information and the image bio information, transmitting the identity read information to an immigration system, and receiving from the immigration system fourth result information about a departure examination result determined based on the identity read information, wherein, when the bearer of the electronic passport is determined as allowed to depart based on the first to fourth result information, the departure management portion opens the exit gate.

According to another aspect of the present invention, a method of automating arrival and departure procedures for controlling a bearer of an electronic passport to undergo a security procedure when passing a path includes generating identity read information and bio read information by reading the electronic passport in which bio information including a face image of an electronic passport owner and identity information of the electronic passport owner are stored, generating image bio information by capturing a face image of the bearer of the electronic passport, generating first result information about forgery of the electronic passport by determining whether the electronic passport is forged, generating second result information about check-in of the bearer of the electronic passport by comparing the identity read information and check-in information received from an airline system, generating third result information about the identity of the bearer of the electronic passport by comparing the bio read information and the image bio information, transmitting the identity read information to an immigration system, and receiving from the immigration system fourth result information about a departure examination result determined based on the identity read information, and analyzing the first to fourth result information and opening an exit gate installed at an exit of the path if the bearer of the electronic passport is determined as allowed to depart.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
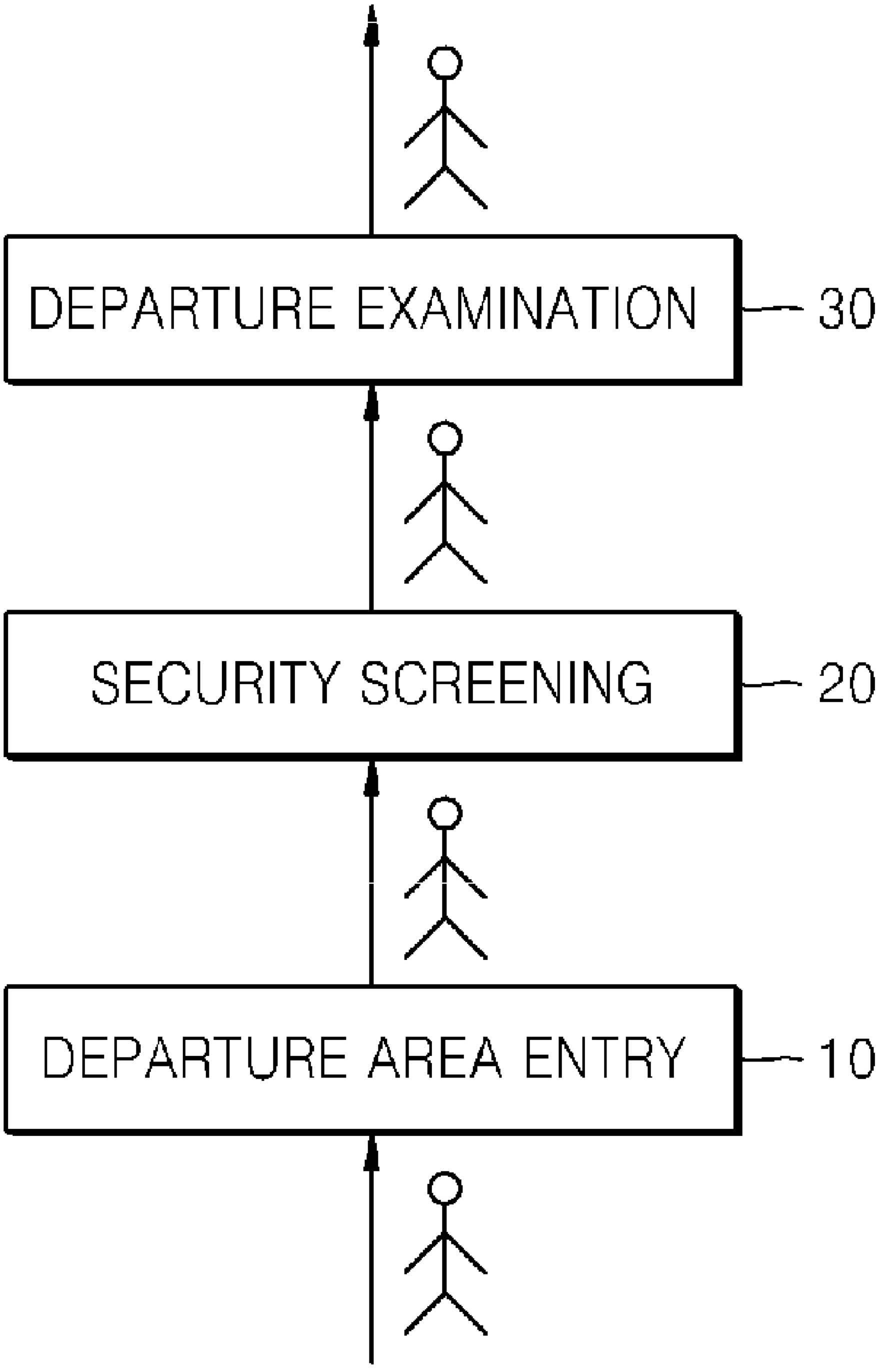
FIG. 1 illustrates a conventional departure area in an airport.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 2:
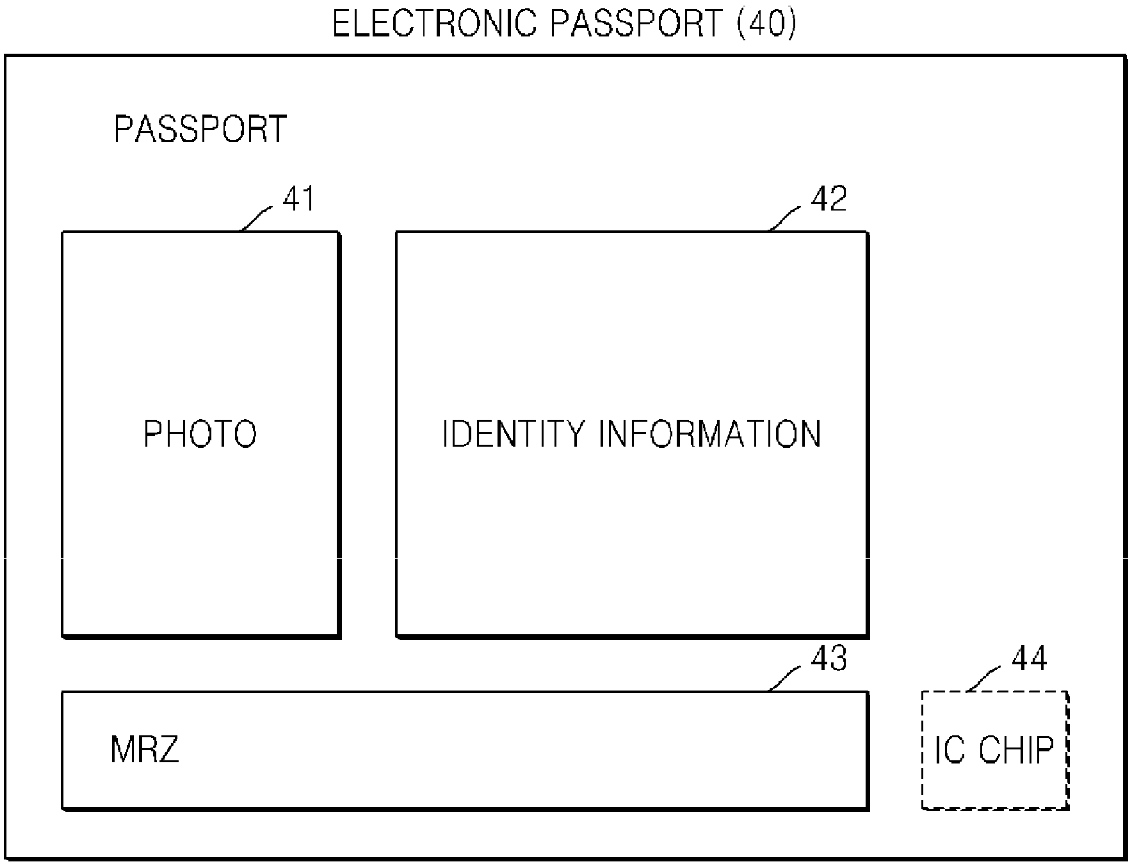
FIG. 2 illustrates an electronic passport used in the present invention.

FIG. 2 illustrates an electronic passport 40 used in the present invention. The electronic passport 40 is manufactured by including an integrated circuit (IC) chip for storing information that may be read in a non-contact manner in an existing machine readable passport (MRP).

As illustrated in FIG. 2, the electronic passport 40 includes a special space that is referred to as a machine readable passport zone (MRZ) 43 and a non-contact IC chip 44. A passport bearer's facial photo 41 and identity information 42 are printed on an identity information page of the electronic passport 40.

The MRZ 43 is a special space provided in a lower portion of the identity information page, where the same identity information as that printed on the identity information page is printed by being encoded in an optical character recognition format. The MRZ 43 consists of two lines having a length of 44 characters. In the MRZ 43, the identity information, including name, passport number, two check digits, nationality, date of birth, gender, passport expiration date, and personal identity number (PIN), is printed by being encoded.

The same identity information as that printed in the MRZ 43 is separately stored in the non-contact IC chip 44. Additionally, bio information of a passport bearer is stored in the non-contact IC chip 44. The bio information stored in the IC chip 44 may include a face image of the passport bearer and additionally a fingerprint image and/or an iris image of the passport bearer.

Since a security technology is applied to the electronic passport 40, it is practically impossible to manipulate the information printed in the MRZ 43 and the information stored in the IC chip 44 at the same time. Thus, even if one of the pieces of information or both pieces of information are manipulated, whether the information is manipulated may be easily identified. Also, since the electronic passport 40 stores the bio information including the face image of the passport bearer, the replacement of a passport photo, which is the most frequently committed passport forgery, may be prevented. Accordingly, the passport bearer may be easily identified by using the bio information stored in the IC chip 44.

The prevent invention provides an apparatus for automating a variety of arrival and departure procedures performed in an arrival area, a departure area, and a transfer area in an airport by checking the forgery of an electronic passport and the identity of a passport bearer using the electronic passport 40.

Figure 3:
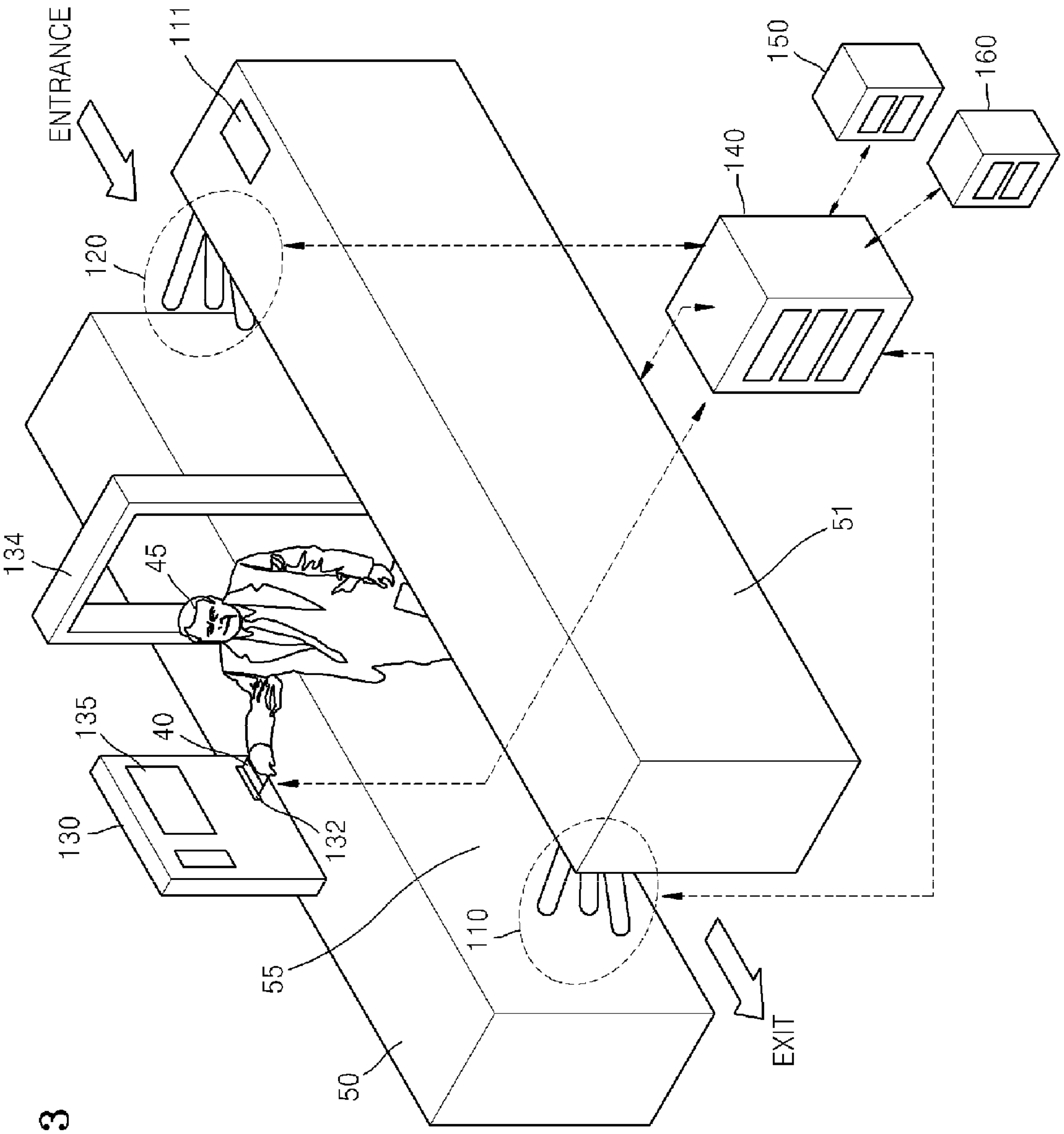
FIG. 3 is a perspective schematic view of an apparatus for automating arrival and departure procedures according to an embodiment of the present invention.
Figure 4:
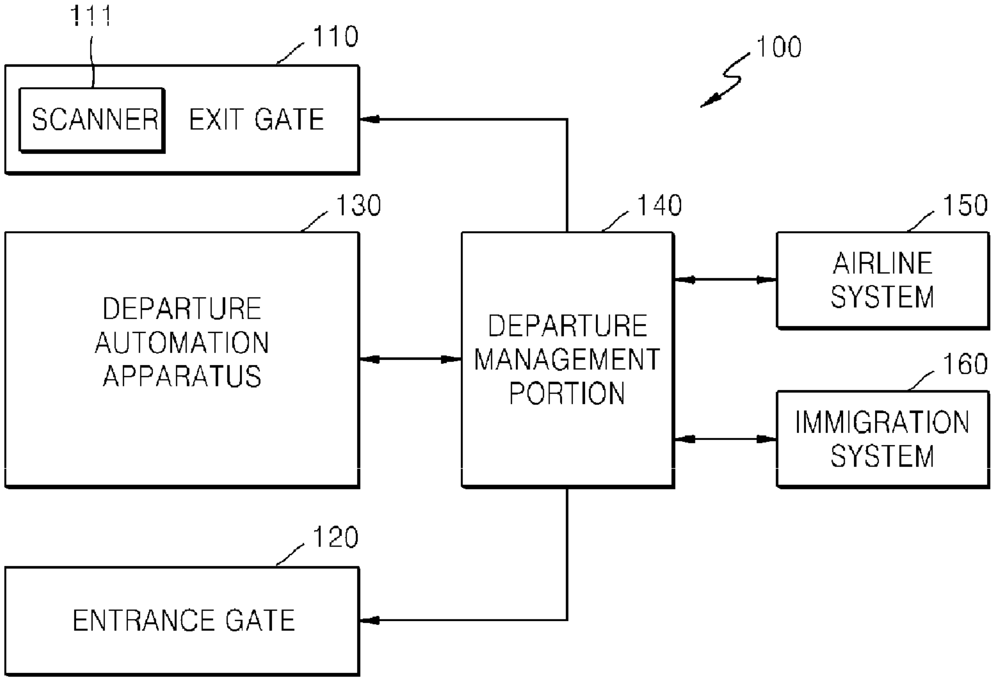
FIG. 4 is a block diagram of the apparatus for automating arrival and departure procedures of FIG. 3.

FIG. 3 is a perspective view of an apparatus 100 for automating arrival and departure procedures according to an embodiment of the present invention. FIG. 4 is a block diagram of the apparatus 100 of FIG. 3.

The apparatus 100 for automating arrival and departure procedures according to the present embodiment guides or limits airline passengers to enter a particular security area by allowing only one who passes a series of security procedures to pass a lane leading to the particular security area.

The apparatus 100 for automating arrival and departure procedures is installed at an entrance of each of an arrival area, a departure area, a boarding area, and a transfer area in an airport. The apparatus 100 for automating arrival and departure procedures automatically determines the identity of an airline passenger entering the arrival area, the departure area, the boarding area, and the transfer area, the forgery of a passport, the arrival or departure permission, and the carry-on of prohibited items on the plane, and decides whether to pass the airline passengers. The airline passengers include arrival passengers, departure passengers, boarding passengers, and transfer passengers that are all bearers of electronic passports. The airline passengers pass a variety of security procedures as will be described later. The apparatus 100 for automating arrival and departure procedures may be installed at the arrival area to determine whether one can enter a country by passing an arrival procedure.

Referring to FIGS. 3 and 4, the apparatus 100 for automating arrival and departure procedures includes an exit gate 110, a departure automation apparatus 130, and a departure management portion 140. The apparatus 100 for automating arrival and departure procedures may further include an entrance gate 120 and a scanner 111. In the apparatus 100 for automating arrival and departure procedures according to the present embodiment of the present invention, a departure area entry procedure, a security screening procedure, and a departure examination procedure for departure passengers, which are conventionally performed separately in different areas, may be incorporated in the same area and performed therein. In present application, the departure/arrival examination means immigration for departure/arrival.

The entrance gate 120 and the exit gate 110 are respectively installed at the entrance and the exit of a path 55. The opening/closing of each of the entrance gate 120 and the exit gate 110 is determined according to a control signal of the departure management portion 140 as will be described later.

The entrance gate 120 may be installed as a part of the apparatus 100 for automating arrival and departure procedures as an additional gate. The entrance gate 120 may be omitted when people are lined up before the entrance gate 120 to enter the path 55 one by one where the departure automation apparatus 130 is installed. However, the entrance gate 120 is installed at the entrance of the path 55 to fundamentally prevent a possibility of many persons entering the path 55 in a group, that is, not one by one.

The entrance gate 120 and the exit gate 110 are designed to allow only one person to enter the path 55 while another person is allowed to enter the path 55 only when the person in the path 55 has exited from the path 55 through either the entrance gate 120 or the exit gate 110. To this end, a sensor for detecting the passage of a person may be installed at the entrance gate 120 and the exit gate 110. When one person passes through the entrance gate 120 or the exit gate 110, the sensor may detect the passage of the person and close the passed gate to prevent two or more persons from passing through the entrance gate 120 or the exit gate 110.

The entrance gate 120 or the exit gate 110 may be implemented by a variety of entrance limiting apparatus, for example, an automatic sliding door, a turnstile, or a barrier. The opening and closing of the entrance gate 120 or the exit gate 110 is determined according to the control signal of the departure management portion 140 as will be described later. Any entrance limiting apparatus capable of guiding or limiting the entrance of a person may be used as the entrance gate 120 or the exit gate 110.

The path 55 between the entrance gate 120 and the exit gate 110 is a space that is segregated from the outside world. Once a person passes through the entrance gate 120, other persons may not pass through the entrance gate 120. The person entering the entrance gate 120 may not pass through the exit gate 110 until the person passes the security procedure.

The operation of the apparatus 100 for automating arrival and departure procedures will be briefly described with reference to FIG. 3. A person 45 who is the bearer of an electronic passport 40 makes his electronic passport 40 scanned by the scanner 111 that is installed at the entrance gate 120. The scanner 111 reads the identity information recorded in the MRZ 43 of the electronic passport 40. The apparatus 100 for automating arrival and departure procedures opens the entrance gate 120 for the subsequent procedure to guide the person 45 to enter the path 55.

The path 55 is segregated from the outside by a first partition 50 and a second partition 51 separately arranged to face each other. The departure automation apparatus 130 is installed beside the path 55. A passport reader 132 included in the departure automation apparatus 130 reads the electronic passport 40 of the person 45 that entered the path 55 and generates identity read information and bio read information. An image capturing device 133 included in the departure automation apparatus 130 captures a face image of the person 45 and generates image bio information. The image capturing device 133 may capture a fingerprint image and/or an iris image in addition to the face image and generate image bio information further including the captured fingerprint image and/or iris image.

The identity read information, the bio read information, and the image bio information are transmitted to the departure management portion 140. The departure management portion 140 checks, by using the transmitted information, whether the electronic passport 40 is counterfeited or fraudulently altered, the person 45 has checked in at an airline counter, the electronic passport 40 belongs to the person 45, and the person 45 had any problems in a result of a departure examination.

A security screening device 134 included in the departure automation apparatus 130 detects whether the person 45 has any carry-on items prohibited on the plane, for example, sharp metal objects or a explosive and flammable materials. If the person 45 has any carry-on items prohibited on the plane, a lamp (not shown) turns on or a speaker (not shown) makes a warning sound for the person 45 or security staff to hear. A result of the security screening by the security screening device 134 is delivered to the departure management portion 140 as check result information. The departure management portion 140 stores a result of the security screening on the person 45.

The departure management portion 140 checks whether the electronic passport 40 is forged, the check-in of the person 45, the identity of the person 45, and the result of a departure examination of the person 45, and controls the opening and closing of the exit gate 110 and the entrance gate 120. If there is a problem in any of the checking processes regarding the forgery of the electronic passport 40, the check-in of the person 45, the identity of the person 45, and the result of a departure examination of the person 45, the departure management portion 140 controls the entrance gate 120 to be opened. When the entrance gate 120 is opened, the person 45 in the path 55 exits from the path 55 through the entrance gate 120 and then passes through a supplement procedure of the procedure in question. The departure management portion 140 communicates with an airline system 150 to check the check-in of the person 45 and with an immigration system 160 to check the departure examination result. Also, the departure management portion 140 further checks the carry-on of prohibited items on the plane and then controls the opening and closing of the exit gate 110.

The departure automation apparatus 130 may further include a guidance output portion 135 that guides the person 45 on actions to perform according to each procedure, by video and/or audio. The guidance output portion 135 provides, by video and/or audio, guide information about the result of each procedure and an appropriate action for a subsequent procedure to the person 45. The guide information may be delivered using a variety of languages, for example, English, Korean, Japanese, Chinese, and so on.

Figure 5:
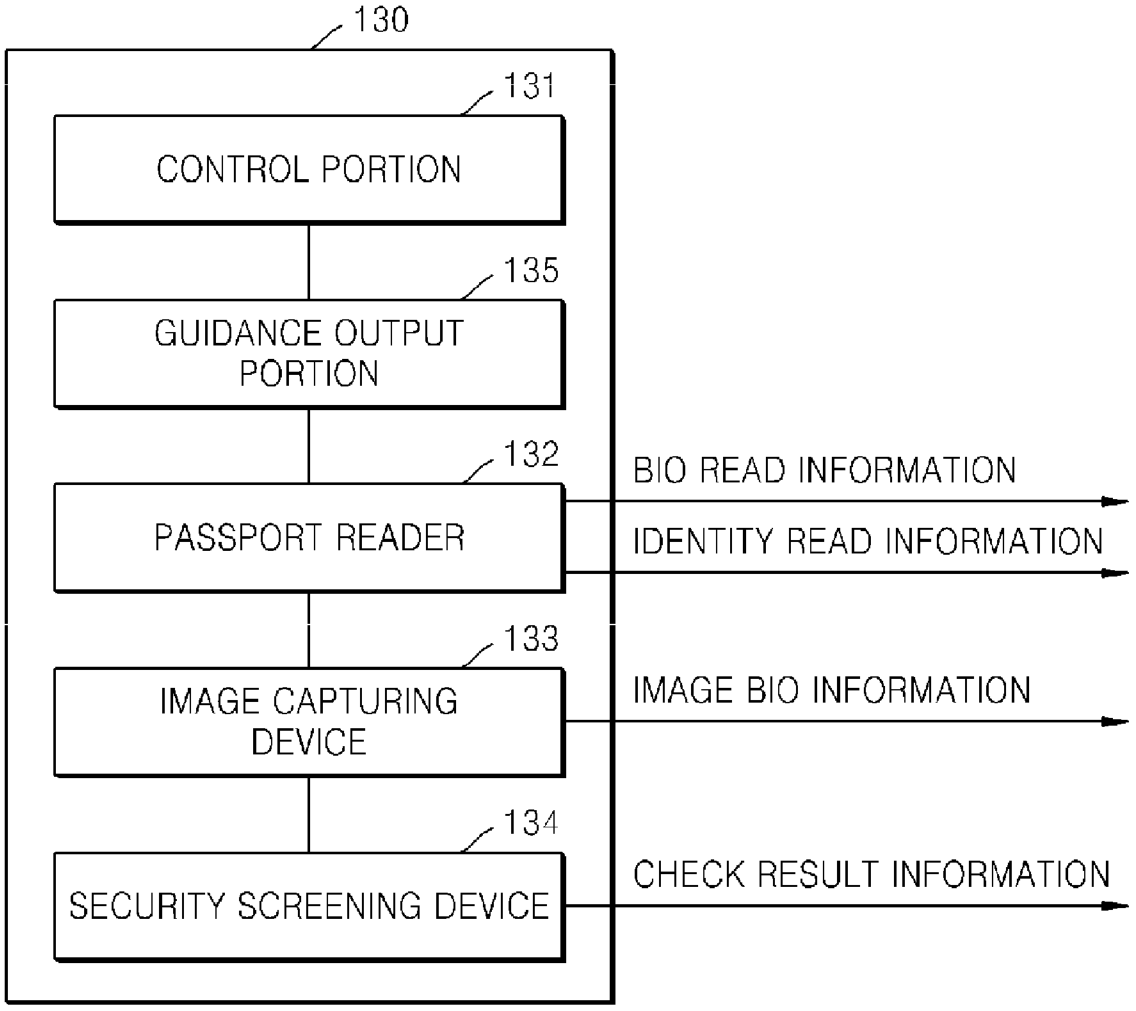
FIG. 5 is a block diagram of the departure automation apparatus 130 of FIG. 4.
Figure 6:
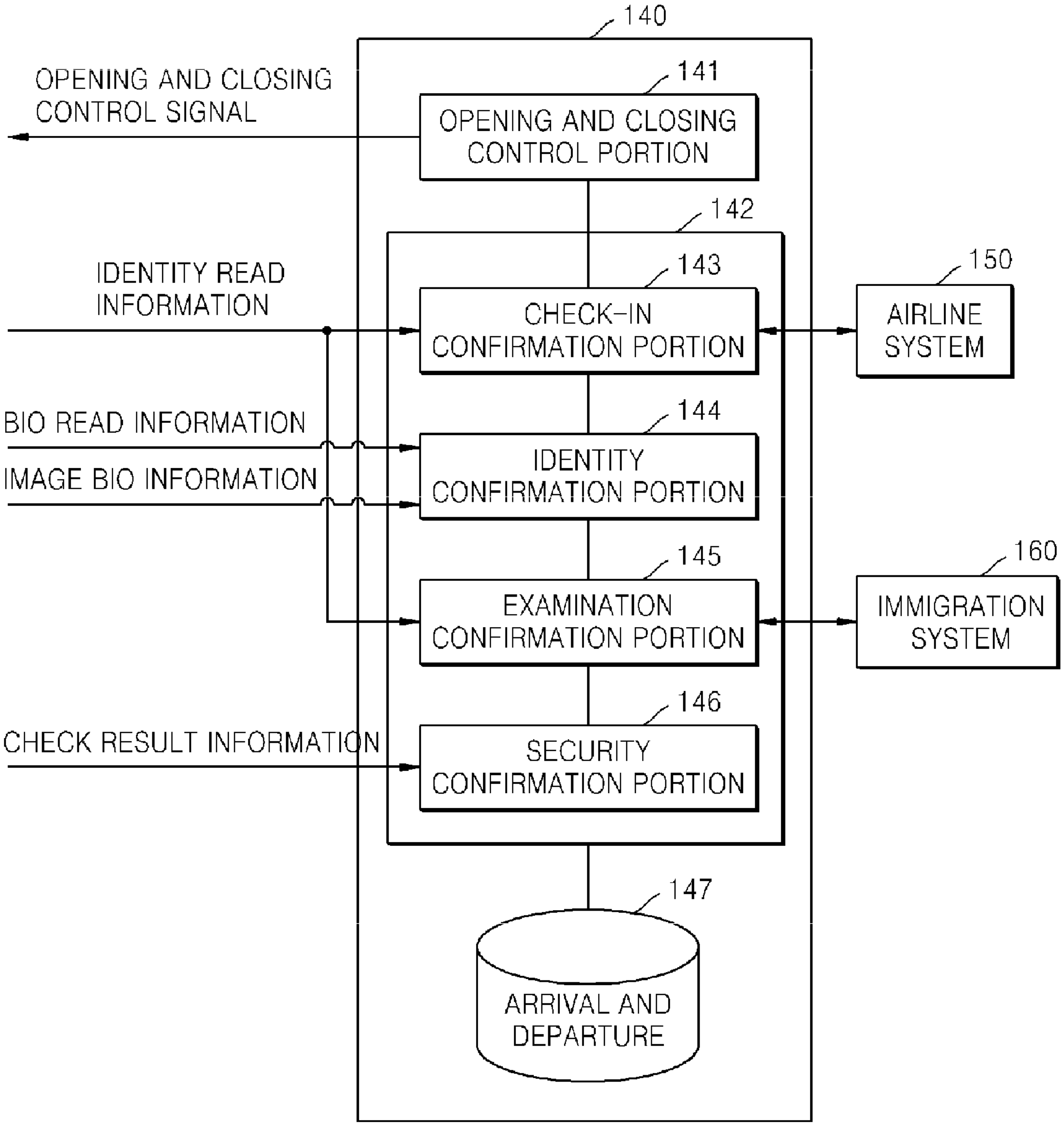
FIG. 6 is a block diagram of the departure management portion 140 of FIG. 4.

FIG. 5 is a block diagram of the departure automation apparatus 130 of FIG. 4. FIG. 6 is a block diagram of the departure management portion 140 of FIG. 4. Referring to FIG. 5, the departure automation apparatus 130 includes a control portion 131, the passport reader 132, and the image capturing device 133. The departure automation apparatus 130 further includes the guidance output portion 135 and the security screening device 134. The departure automation apparatus 130 is installed beside the path 55 that is a segregated space between the entrance gate 120 and the exit gate 110 and may be implemented in the form of a kiosk that is an automated terminal.

The control portion 131 is responsible for the control of the respective constituent elements of the departure automation apparatus 130, that is, the passport reader 132, the image capturing device 133, the guidance output portion 135, and the security screening device 134. The passport reader 132 determines the forgery of the electronic passport 40 by reading the electronic passport 40, generates first result information including information about the forgery of the electronic passport 40, and transmits the first result information to the departure management portion 140. Also, the passport reader 132 generates identity read information by reading the identity information recorded in the MRZ 43 of the electronic passport 40 and bio read information by reading the bio information stored in the IC chip 44 of the electronic passport 40. The identity read information and the bio read information are transmitted to the departure management portion 140.

The MRZ 43 and the IC chip 44 of the electronic passport 40 contain the same information about identity. Thus, the passport reader 132 may read the identity information recorded in the MRZ 43 and the identity information stored in the IC chip 44 and compare both the identity information to check the forgery of the electronic passport 40. Also, the passport reader 132 may generate identity read information by using the identity information stored in the IC chip 44 only.

The image capturing device 133 captures a face image of a passport bearer to generate image bio information, and transmits the generated image bio information to the departure management portion 140. The image capturing device 133 may capture not only the face image of the passport bearer but also a fingerprint image and/or an iris image of the passport bearer. In the case of capturing a fingerprint image and/or an iris image, the image bio information may further include the fingerprint image and/or the iris image in addition to the face image.

The security screening device 134 checks whether the passport bearer who is in the path 55 has carry-on items prohibited on the plane such as sharp metal objects or explosive and flammable materials, generates information based on a result of the check, and transmits the generated information to the departure management portion 140. The security screening device 134 may use a door frame type detector used for conventional security screenings; however the security screening device 134 is not limited thereto and any device capable of detecting the items prohibited on the plane may be used instead.

The guidance output portion 135 guides the passport bearer in the path 55 on actions to perform for each procedure and provides information, by video and/or audio, about a result of the procedure to the passport bearer.

Referring to FIG. 6, the departure management portion 140 may include an opening and closing control portion 141 and a security procedure check portion 142 and further include an arrival and departure passenger database (DB) 147. The security procedure check portion 142 may include a check-in confirmation portion 143, an identity confirmation portion 144, and an examination confirmation portion 145, and further include a security confirmation portion 146.

The check-in confirmation portion 143 determines whether the passport bearer passing through the entrance gate 120 is one who already checked in at the airline counter, and generates second result information including information about the check-in of the passport bearer passing through the entrance gate 120. To this end, the check-in confirmation portion 143 receives in advance check-in information including information about passengers who completed the check-in procedure and received boarding passes, from the airline system 150, compares the identity read information received from the passport reader 132 and the check-in information received from the airline system 150, and determines whether the passport bearer is one who already checked in at the airline counter.

The identity confirmation portion 144 checks whether the passport bearer passing through the entrance gate 120 is the true owner and generates third result information about the identity of the passport bearer. To this end, the identity confirmation portion 144 compares the bio read information received from the passport reader 132 and the image bio information received from the image capturing device 133, and identifies the passport bearer by determining whether both of bio information match each other.

To identify the true owner, a face image is mainly used. When a fingerprint image and/or an iris image of the passport bearer are to be further stored in the electronic passport 40, the image capturing device 133 may capture the fingerprint image and/or the iris image and generate the image bio information including the fingerprint image and/or the iris image. In this case, the identity confirmation portion 144 identifies the true owner by determining whether the fingerprint image and/or the iris image stored in the electronic passport 40 and the fingerprint image and/or the iris image captured by the image capturing device 133 match each other. The accuracy in the identification of the true owner may be improved by further using the fingerprint image and/or the iris image in addition to the face image.

The identity confirmation portion 144 may also be included in the departure automation apparatus 130. In this case, the passport reader 132 may quickly identify the true owner by instantly comparing the bio read information and the image bio information.

The examination confirmation portion 145 communicates with the immigration system 160 that is operated for the examination of arriving and departure passengers, and receives fourth result information including information about a departure examination result of departure passengers. To this end, the examination confirmation portion 145 transmits the identity read information read by the passport reader 132 to the immigration system 160. When necessary to register the bio information to the immigration system 160, the examination confirmation portion 145 may transmit the bio read information read by the passport reader 132 and the image bio information generated by the capturing device 133.

The immigration system 160 is a system for performing a departure examination on departure passengers and registering identity information and bio information of departure passengers and transfer passengers. The immigration system 160 includes an integrated passenger DB (not shown) storing the identity information and the bio information of the departing and arriving passengers and the transfer passengers and arrival and departure records and transfer records of all departing and arriving passengers in an airport.

Although not illustrated in FIG. 6, the immigration system 160 may include the integrated passenger DB in which identity information and bio information of all users of an airport, including the departing and arriving passengers and the transfer passengers, and further include a criminal DB (not shown) storing information about criminals.

The immigration system 160 compares and searches the integrated passenger DB and the criminal DB based on the identity read information received from the examination confirmation portion 145, generates the fourth result information including information about a departure examination result of departure passengers, and transmits the generated fourth result information to the examination confirmation portion 145. When necessary, the immigration system 160 receives the bio read information and the image bio information from the departure management portion 140 and performs a departure examination using the received bio read information and the image bio information.

When a departure passenger is prevented from departing as a result of automatically performing a departure examination using the identity read information, the immigration system 160 transmits the fourth result information to a departure examiner so that the departure examiner may examine the departure passenger.

The airline system 150 is a system for performing procedures related to flight reservations, check-ins, and boarding of passengers of an airplane, such as reserved passengers, boarding passengers, and transfer passengers. The airline system 150 stores identity information, flight reservation information, check-in information, and boarding information of the passengers in a DB (not shown).

Although the airline system 150 and the immigration system 160 are systems respectively operated by an airline responsible for reservation and boarding of airline passengers and the Ministry of Justice managing the arrival and departure examination, the airline system 150 and the immigration system 160 may be constituent elements of the apparatus 100 for automating arrival and departure procedures according to the present embodiment of the present invention for the integration of the arrival and departure procedures in an airport.

The security confirmation portion 146 checks whether a person passing through the entrance gate 120 has carry-on items prohibited on the plane, by receiving check result information from the security screening device 134.

The opening and closing control portion 141 determines whether the person passing through the entrance gate 120 is one who is allowed to depart, based on the first to fourth result information, and accordingly generates a control signal to control the opening and closing of the entrance gate 120 and the exit gate 110. That is, if the person passing through the entrance gate 120 is determined as one allowed to depart, the opening and closing control portion 141 generates a control signal to open the exit gate 110 and transmits the control signal to the exit gate 110. Otherwise, if the person passing through the entrance gate 120 is determined as one who is not allowed to depart, the opening and closing control portion 141 generates a control signal to open the entrance gate 120 and transmits the control signal to the entrance gate 120.

The first to fourth result information all are information related to the security procedures and include information about the passing of the security procedures. Accordingly, the opening and closing control portion 141 opens the exit gate 110 only when the passport bearer passes all security procedures according to the first to fourth result information. If the passport bearer fails to pass any one of the security procedures the opening and closing control portion 141 does not open the exit gate 110 and opens the entrance gate 120 so that the passport bearer who failed to pass the security procedures may be prevented from passing the exit gate 110.

The opening and closing control portion 141 may control the exit gate 110 and the entrance gate 120 based on not only the first to fourth result information but also the check result information. The opening and closing control portion 141 may open the exit gate 110 only when the passport bearer passes not only the security procedures determined by the first to fourth result information but also the security screening procedure determined by the check result information.

The departure management portion 140 includes an arrival and departure passenger DB 147 which contains the identity read information, the bio read information, the image bio information, and the information about the permission of departure that is finally determined based on the first to fourth result information, for each departing and arriving passenger and uses the apparatus 100 for automating arrival and departure procedures. The arrival and departure passenger DB 147 stores not only information about the above-described departure passengers, but also identity information and bio information for each of the departure passengers and the transfer passengers, together with related arrival records, transfer records, and flight boarding records.

As described above, in the present invention, both of an embodiment in which the entrance gate 120 is installed as a part of the apparatus 100 for automating arrival and departure procedures and an embodiment in which the installation of the entrance gate 120 is omitted may be formed.

An embodiment of opening the entrance gate 120 only when a departure passenger checks in at the airline counter in advance is possible. To this end, the scanner 111 scans the identity information recorded in the MRZ 43 of the electronic passport 40, generates MRZ information (not shown), and transmits the generated MRZ information to the departure management portion 140. The departure management portion 140 compares the check-in information previously received from the airline system 150 and the MRZ information. As a result of the comparison, when the person 45 departing the airport already checked in at the airline counter, the entrance gate 120 is opened for the subsequent procedure to guide the person 45 to enter the path 55.

In the embodiment in which the entrance gate 120 is opened only when the person 45 is one who already checked in, the opening and closing control portion 141 of the departure management portion 140 controls the opening and closing of the exit gate 110 and the entrance gate 120 based on the first, third, and fourth result information after all security procedures are completed.

Although the present invention is related to the automation of arrival and departure procedures using the electronic passport 40, an embodiment of using a general passport that is the MRP, not the electronic passport 40. The general passport that is not the electronic passport 40 may be used in the present invention because the scanner 111 and the passport reader 132 may read the identity information recorded in the MRZ 43.

In the embodiment of using the general passport, since bio information is not stored in the general passport, one who bears a general passport (hereinafter referred to as the general passport bearer) may use the apparatus 100 for automating arrival and departure procedures according to the present invention only when the bio information of the general passport bearer is registered in the arrival and departure passenger DB 147. When the bio information of the general passport bearer is registered in the arrival and departure passenger DB 147, the identity confirmation portion 144 of the departure management portion 140 may check whether the general passport bearer is the true owner by comparing the image bio information received from the image capturing device 133 and the bio information registered in the arrival and departure passenger DB 147, and generate the third result information about the identity of the general passport bearer.

According to the present invention, all of the electronic passport forgery checking procedure, the check-in confirmation procedure, the identity confirmation procedure, the examination result confirmation procedure, and the security screening result confirmation procedure may be automated so that there may be no need to check boarding passes of passengers one by one during the arrival and departure examination procedures.

Figure 7:
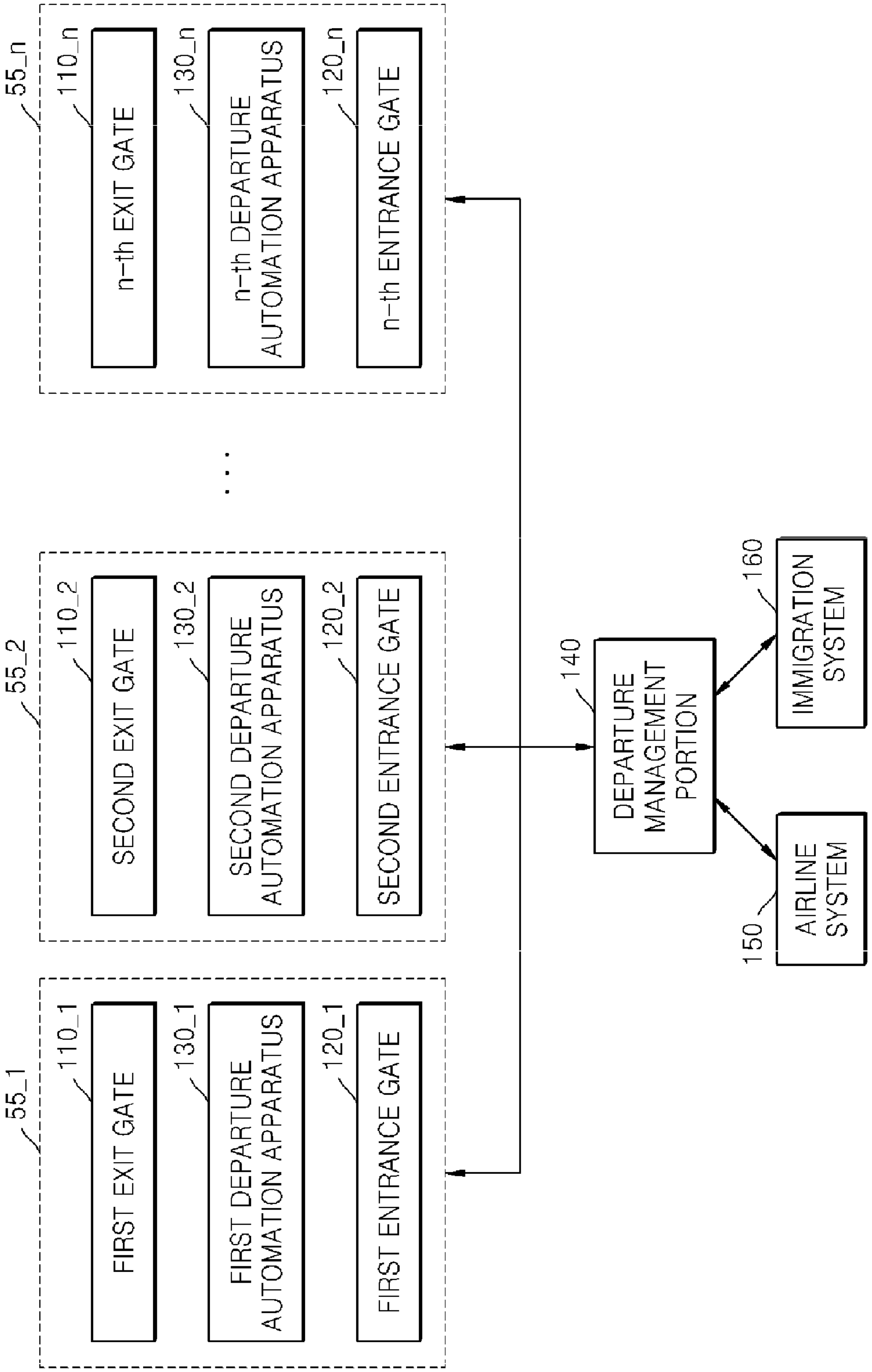
FIG. 7 is a block diagram of an apparatus for automating arrival and departure procedures according to another embodiment of the present invention.

FIG. 7 is a block diagram of an apparatus for automating arrival and departure procedures according to another embodiment of the present invention. Referring to FIG. 7, the apparatus for automating arrival and departure procedures according to the present embodiment includes a departure management portion 140, a plurality of departure automation apparatuses **130_1-130_*n* respectively in a plurality of departure paths 55_1-55_*n*, a plurality of entrance gates 120_1-120_*n* respectively installed at the entrances of the departure paths 55_1-55_*n*, a plurality of scanners (not shown), and a plurality of exit gates 110_1-110_*n* respectively installed at the exits of the departure paths 55_1-55_*n*, where n is a positive integer. The apparatus for automating arrival and departure procedures may further include the airline system 150 and the immigration system 160. Since the departure automation apparatuses 130_1-130_*n*, the entrance gates 120_1-120_*n*, the exit gates 110_1-110_*n*, the airline system 150**, the scanner, and the immigration system 160 are substantially the same as those described in the above, descriptions thereof may be omitted herein.

The departure management portion 140 receives bio read information, identity read information, and image bio information from each of the departure automation apparatuses **130_1-130_*n*. The departure management portion 140 performs security procedures on departure passengers using each of the departure automation apparatuses 130_1-130_*n* based on the received bio read information, identity read information, and image bio information, and controls opening and closing of each of the exit gates 110_1-110_*n* and the entrance gates 120_1-120_*n*. Each of the departure automation apparatuses 130_1-130_*n*, the exit gates 110_1-110_*n*, and the entrance gates 120_1-120_*n* has its own ID number. The departure management portion 140 communicates with each of the departure automation apparatuses 130_1-130_*n* and each of the exit gates 110_1-110_*n* and the entrance gates 120_1-120_*n***, by using the ID number.

Figure 8:
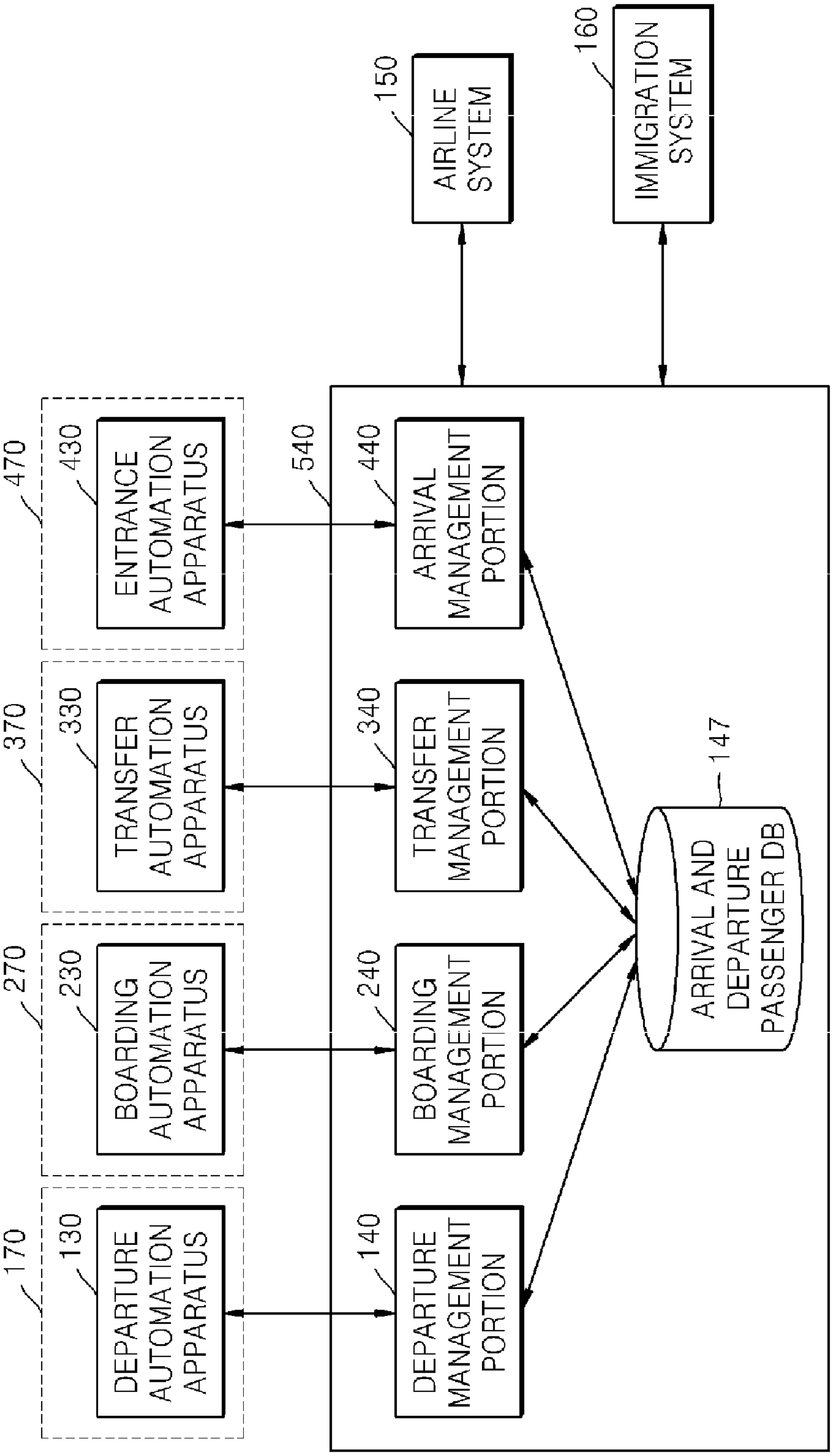
FIG. 8 is a block diagram of an apparatus for automating arrival and departure procedures according to another embodiment of the present invention.

FIG. 8 is a block diagram of an apparatus for automating arrival and departure procedures according to another embodiment of the present invention. Referring to FIG. 8, the apparatus for automating arrival and departure procedures according to the present embodiment includes an arrival and departure management portion 540, the departure automation apparatus 130, a boarding automation apparatus 230, a transfer automation apparatus 330, and an arrival automation apparatus 430. The apparatus for automating arrival and departure procedures may further include the airline system 150 and the immigration system 160. The arrival and departure management portion 540 includes the departure management portion 140, a boarding management portion 240, a transfer management portion 340, and an arrival management portion 440. The departure automation apparatus 130, the boarding automation apparatus 230, the transfer automation apparatus 330, and the arrival automation apparatus 430 are respectively installed at the entrances of a departure area 170, a boarding area 270, a transfer area 370, and an arrival area 470 and are kiosk-type automation apparatuses used for performing security procedures for departure passengers, boarding passengers, transfer passengers, and arriving passengers.

Although not illustrated in FIG. 8, each of the departure automation apparatus 130 and the boarding automation apparatus 230 includes an entrance gate and an exit gate. The departure management portion 140 and the boarding management portion 240 control the opening and closing of each of the entrance gate and the exit gate according to whether the departure passengers and the boarding passengers pass all of the security procedures for departure and boarding. Since descriptions about the departure automation apparatus 130 and the departure management portion 140 are substantially the same as those above, detailed descriptions thereof will be omitted herein.

The boarding automation apparatus 230, the transfer automation apparatus 330, and the arrival automation apparatus 430 perform substantially the same functions as those of the departure automation apparatus 130. Accordingly, each of the boarding automation apparatus 230, the transfer automation apparatus 330, and the arrival automation apparatus 430 may include a control portion (not shown) controlling constituent elements, a passport reader (not shown) reading information stored in an electronic passport and determining whether the electronic passport is forged, an image capturing device (not shown) capturing an image of a passport bearer and generating image bio information such as face, fingerprint, and/or iris image information, and a guidance output portion (not shown) guiding on actions to perform for each procedure, by video and/or audio.

The boarding automation apparatus 230 is used for the security procedure that is performed on boarding passengers and is installed in a boundary area leading to a boarding gate of an airplane. The boarding automation apparatus 230 is installed in a path formed by a pair of partition walls (not shown) separated to face each other. An entrance gate (not shown) and an exit gate (not shown) are respectively installed at the entrance and exit of the path. The path formed between the entrance gate and the exit gate is segregated from the outside The boarding management portion 240 performs boarding security procedures by using the identity read information and the bio read information of passengers received from the boarding automation apparatus 230, and guides or limits the entrance of the passengers according to the boarding security procedures.

The transfer automation apparatus 330 is installed between the transfer area and the boarding gate of an airplane. The transfer management portion 340 communicates with the transfer automation apparatus 330, the airline system 150, and the immigration system 160. The transfer management portion 340 registers identity information and bio information of transfer passengers entering the transfer area in the arrival and departure passenger DB 147 and the integrated passenger DB of the immigration system 160.

The arrival automation apparatus 430 is installed between the boarding gate of an airplane and the arrival area, and communicates with the transfer automation apparatus 330, the airline system 150, and the immigration system 160. The arrival management portion 440 registers the identity information and bio information of passengers entering the arrival area in the arrival and departure passenger DB 147 and the integrated passenger DB of the immigration system 160.

Methods of automating arrival and departure procedures performed by the apparatus 100 for automating arrival and departure procedures, according to embodiments of the present invention, will be described in order using flowcharts. Repetitive descriptions in the methods of automating arrival and departure procedures will be omitted for convenience of description.

Figure 9A:
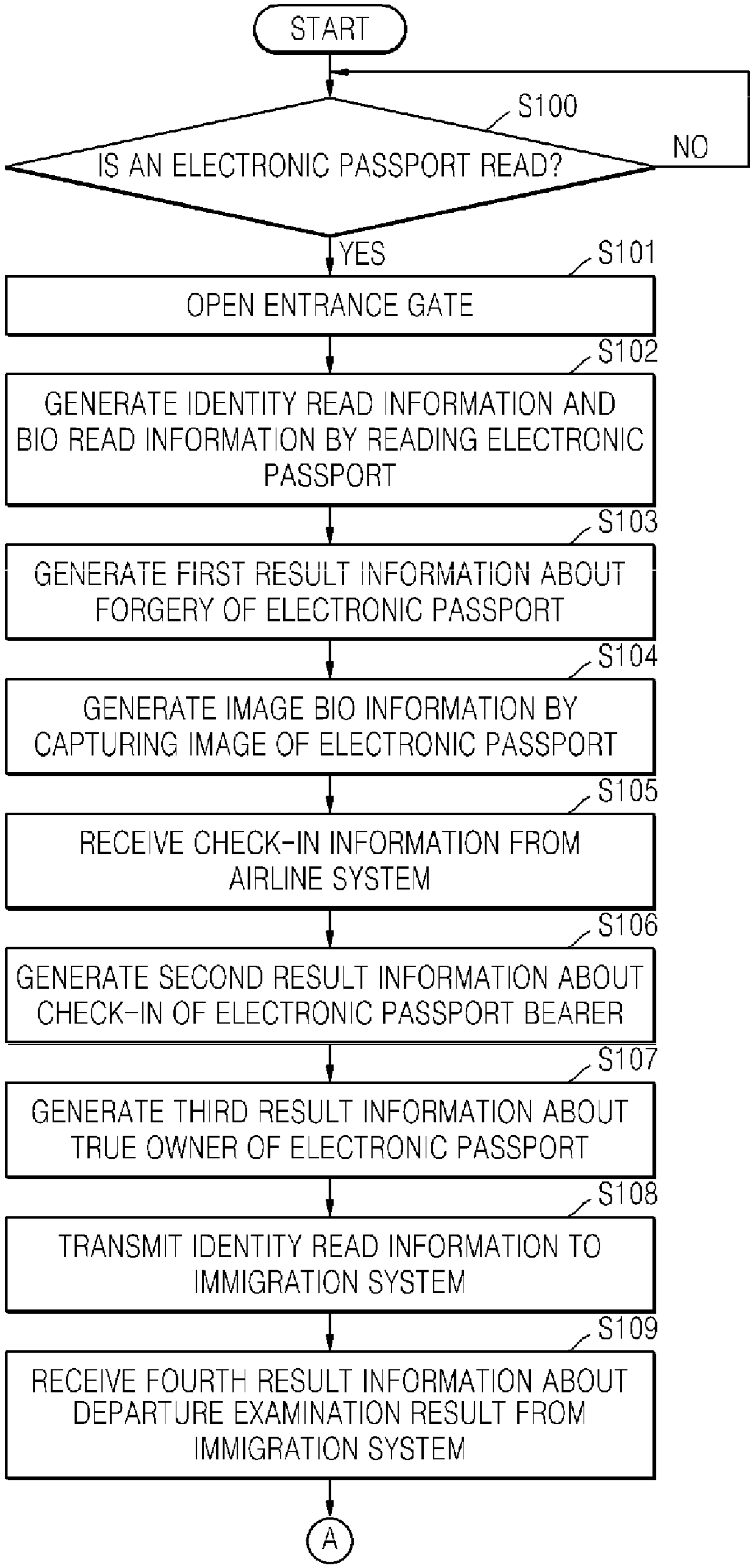
FIG. 9 is a flowchart for explaining a method of automating arrival and departure procedures, according to an embodiment of the present invention.
Figure 9B:
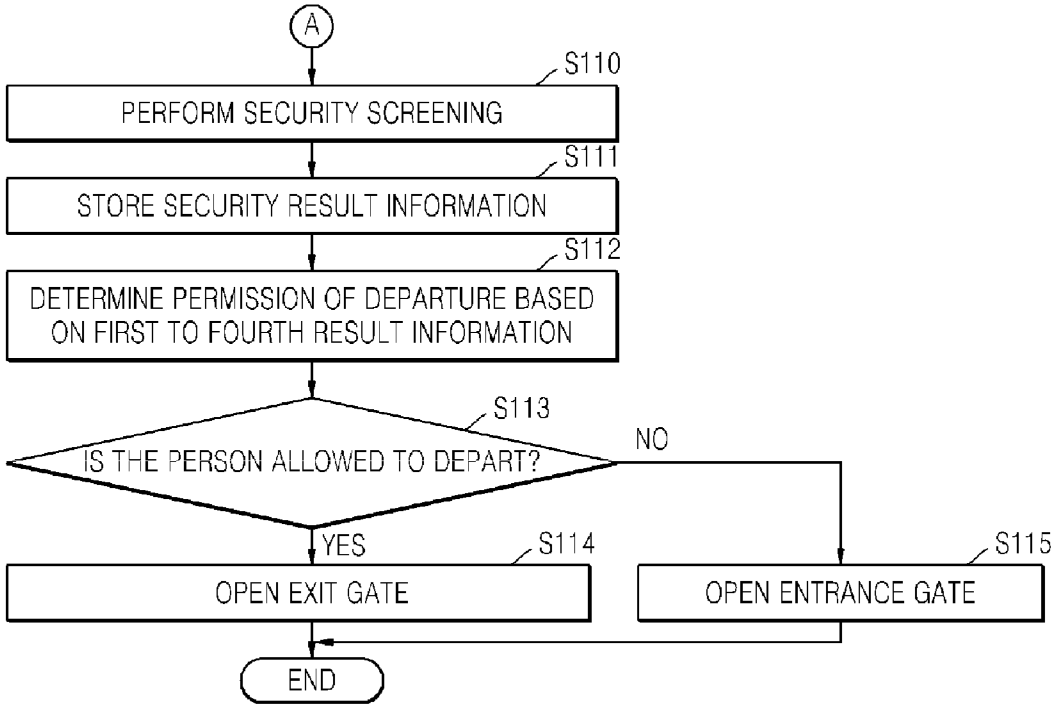

FIG. 9 is a flowchart for explaining a method of automating arrival and departure procedures, according to an embodiment of the present invention. According to the present embodiment of the present invention, the departure area entry procedure, the security screening procedure, and the departure examination procedure of departure passengers, which are conventionally performed independently in different places, are integrally performed in the same place.

First, a bearer of the electronic passport 40 who desires to fly out contacts the page of the electronic passport 40 where the MRZ 43 is located, on the scanner 111 installed near the entrance gate 120. The scanner 111 reads identity information recorded in the MRZ 43 of the electronic passport 40 (S100).

The scanner 111 reads the identity information recorded in the MRZ 43 of the electronic passport 40, and opens the entrance gate 120 to allow the bearer of the electronic passport 40 to enter the path 55 between the entrance gate 120 and the exit gate 110 (S101).

In the present embodiment, the entrance gate 120 may be implemented to open only if the bearer of the electronic passport 40 has already checked in at the airline counter. To this end, the scanner 111 transmits the identity read information to the departure management portion 140. The departure management portion 140 compares check-in information received from the airline system 150 and the identity read information read by the scanner 111, and opens the entrance gate 120 only if the bearer of the electronic passport 40 has already checked in at the airline counter.

The departure automation apparatus 130 generates the identity read information and bio read information by reading the electronic passport 40 (S102). Also, the departure automation apparatus 130 checks whether the electronic passport 40 is forged, and generates first result information including information about the forgery of the electronic passport 40 (S103). The image of the bearer of the electronic passport 40 who desires to fly out is captured to generate image bio information (S104). The identity read information, the bio read information, the generated first result information, and the image bio information are transmitted to the departure management portion 140.

The departure management portion 140 receives check-in information including information about the persons that completed the check-in procedure, from the airline system 150 (S105). By comparing the check-in information received from the airline system 150 and the identity read information received from the departure automation apparatus 130, second result information including information about the check-in of the bearer of the electronic passport 40 is generated (S106).

Also, the departure management portion 140 compares the image bio information and the bio read information received from the departure automation apparatus 130, determines whether the two bio information match each other, and generates third result information including information about the true owner of the electronic passport 40 (S107). The departure management portion 140 transmits the identity read information received from the departure automation apparatus 130 to the departure examination system 160 (S108), and receives fourth result information including information about a result of the departure examination from the departure examination system 160 (S109).

If necessary, the departure management portion 140 may transmit the bio read information and the image bio information to the departure examination system 160. The departure examination system 160 may use the bio read information and the image bio information for the departure examination.

The departure automation apparatus 130 checks whether the bearer of the electronic passport 40 has any carry-on items prohibited on the plane (S110), generates check result information including information about a result of the security screening, and transmits the generated information to the departure management portion 140. The departure management portion 140 stores the check result information (S111).

The departure management portion 140 determines whether the bearer of the electronic passport 40 is allowed to depart based on the first to fourth result information (S112). If the bearer of the electronic passport 40 is determined as allowed to depart, (S113) the departure management portion 140 opens the exit gate 110 (S114). Otherwise, the departure management portion 140 opens the entrance gate 120 (S115).

Although not illustrated, the guidance output portion may provide, by video and/or audio, information about the result of each operation and guide information about actions to perform for each operation to the departure passenger. An embodiment in which the installation of the entrance gate 120 is omitted may be formed, and in this case, operations S100-S101 and S115 may be omitted.

Also, as described above, an embodiment in which only a person checked in at the airline counter may enter the path 55 through the entrance gate 120 may be formed. In this case, whether the electronic passport owner has checked in is determined by comparing the identity read information obtained by the scanner 111 of the entrance gate 120 and the check-in information received from the airline system 150, and the entrance gate 120 is opened only when the electronic passport owner checks in.

Figure 10A:
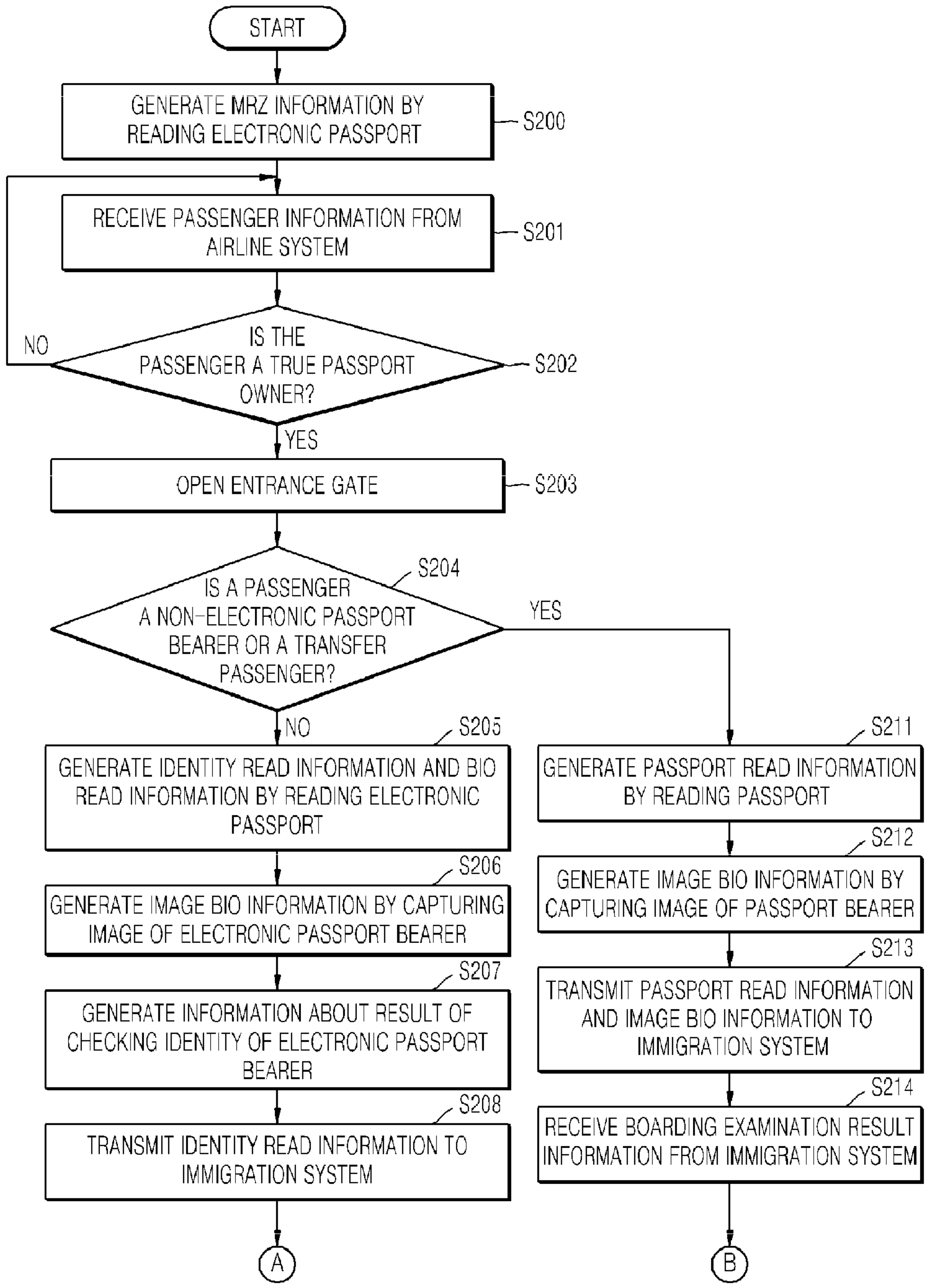
FIG. 10 is a flowchart for explaining a method of automating arrival and departure procedures, according to another embodiment of the present invention.
Figure 10B:
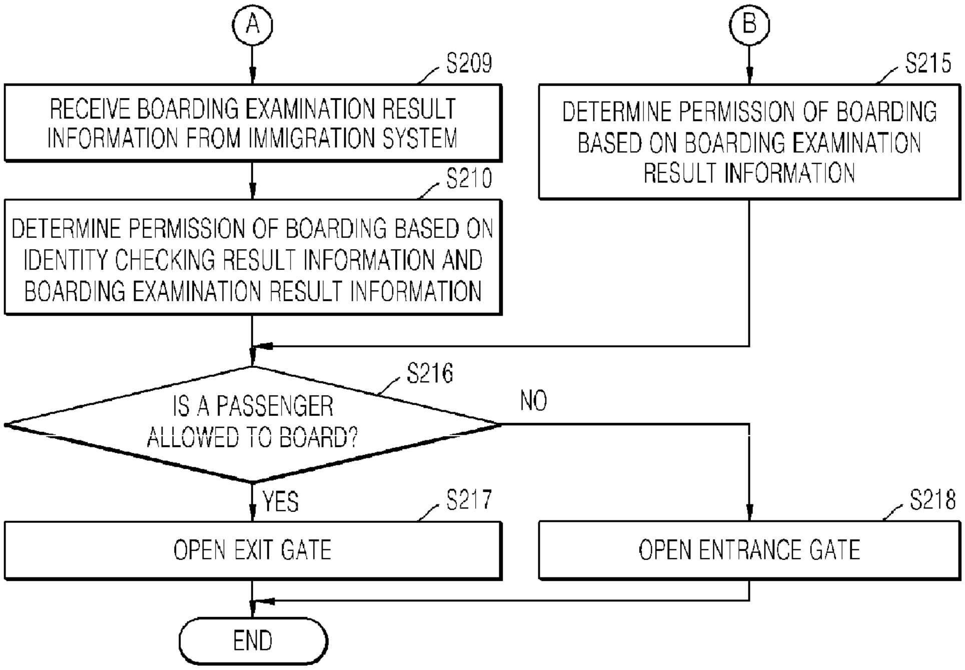

FIG. 10 is a flowchart for explaining a method of automating arrival and departure procedures, according to another embodiment of the present invention. FIG. 10 illustrates a method of performing a security procedure on a passenger in a boarding area during the arrival and departure procedure, that is, a method of performing a security procedure performed on passengers in a boarding area before boarding on an airplane after passing through the security procedure in the departure area.

The boarding automation apparatus 230 receives passenger information about persons to board on an airplane, from the airline system 150 (S200). The scanner 111 installed at the entrance gate 120 reads the MRZ 43 of the electronic passport 40 to generate MRZ read information. The generated MRZ information is transmitted to the boarding automation apparatus 230 (S201).

The boarding automation apparatus 230 compares the received passenger information and the MRZ information read by the scanner 111 and determines whether the bearer of the electronic passport 40 is the true owner of the electronic passport 40 (S202). If the bearer of the electronic passport 40 is a true owner of the electronic passport 40, the boarding automation apparatus 230 opens the entrance gate 120 to allow the passenger who is the true owner of the electronic passport 40 to enter the path 55 (S203).

The boarding automation apparatus 230 checks the existence of the IC chip 44, or the passenger information or the read MRZ information, and determines whether the passenger is a bearer of a non-electronic passport (a general passport) or a transfer passenger (S204).

If the passenger is an electronic passport bearer and not a transfer passenger, the boarding automation apparatus 230 reads the electronic passport 40 to generate identity read information and bio read information (S205), and determines whether the electronic passport 40 is forged. Also, the boarding automation apparatus 230 captures an image of the electronic passport bearer to generate image bio information (S206). The identity read information, bio read information, and image bio information are transmitted to the boarding management portion 240.

The boarding management portion 240 compares the bio read information and the image bio information received from the boarding automation apparatus 230 to identify the electronic passport bearer, and generates identity check result information (S207). The boarding management portion 240 transmits the identity read information to the immigration system 160 (S208), and receives boarding examination result information from the immigration system 160 (S209). If necessary, the boarding management portion 240 may transmit the bio information and the image bio information to the immigration system 160. The immigration system 160 may use the bio read information and the image bio information for boarding examination.

The boarding management portion 240 determines whether the passenger who is the electronic passport bearer is allowed to board, based on information about the forgery of the electronic passport 40, identity of the bearer of the electronic passport 40, and the boarding examination result (S210).

If the electronic passport bearer is determined as allowed to board, the boarding management portion 240 opens the exit gate 110 (S217). Otherwise, the boarding management portion 240 opens the entrance gate 120 (S218).

If the passenger is determines to be either the bearer of a non-electronic passport (a general passport) or a transfer passenger in the operation S204, the boarding automation apparatus 230 reads the electronic passport 40 to generate identity read information (S211), determines whether the electronic passport 40 is forged, and captures an image of the bearer of the electronic passport 40 to generate image bio information (S212).

The boarding management portion 240 transmits the read passport information and image bio information received from the boarding automation apparatus 230 to the immigration system 160 (S213), and receives the boarding examination result information from the immigration system 160 (S214).

The boarding management portion 240 determines whether the passenger is allowed to board based on the information about the forgery of the electronic passport 40 and the boarding examination result (S215). Operations S216 and the subsequent operations are performed as described above. The guidance output portion of the boarding automation apparatus 230 may provide information, by video and/or audio, about actions to perform for each procedure to a departure passenger.

As described above with reference to FIG. 9, an embodiment in which the installation of the entrance gate 120 is omitted may be formed. Also, an embodiment, in which, when a passport bearer passes through the entrance gate 120 to use the boarding automation apparatus 230, the scanner 111 installed at the entrance gate 120 simply reads a passport and determines whether to open the entrance gate 120, may be formed. In the embodiment, the procedure of identifying whether a passenger is a true passport owner is performed after the passenger passes through the entrance gate 120. To finally open the exit gate 110, it is checked whether the passenger is a true passport owner.

Figure 11:
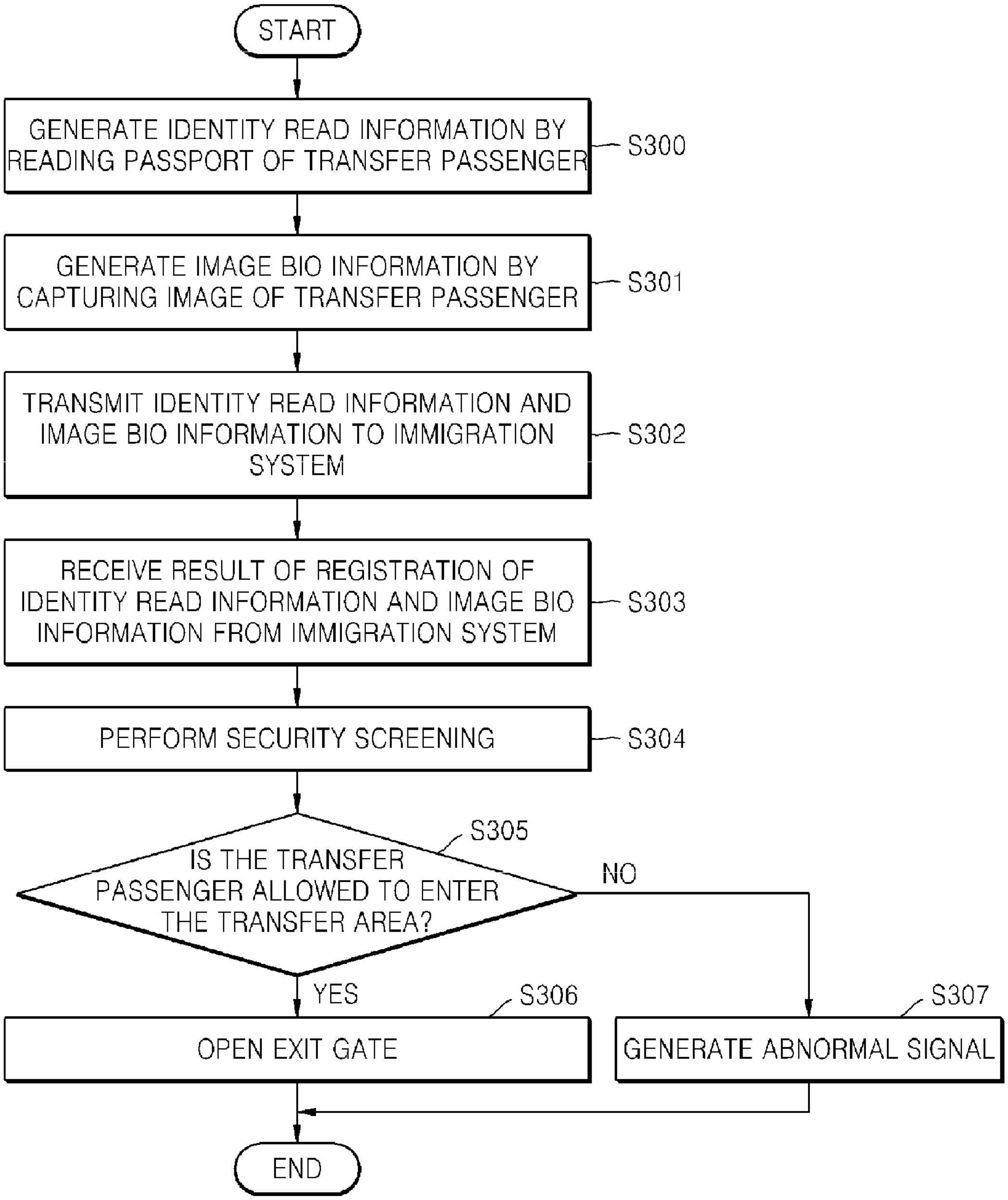
FIG. 11 is a flowchart for explaining a method of automating arrival and departure procedures, according to another embodiment of the present invention.

FIG. 11 is a flowchart for explaining a method of automating arrival and departure procedures, according to another embodiment of the present invention. FIG. 11 illustrates a method of performing a security procedure on a transfer passenger in a transfer area during the arrival and departure procedure.

Referring to FIG. 11, the transfer automation apparatus 330 reads the passport of a transfer passenger who is the passport bearer and generates identity read information (S300), checks the forgery of the passport, and captures an image of the passport bearer to generate image bio information (S301).

The transfer management portion 340 receives identity read information and image bio information from the transfer automation apparatus 330, and transmits the identity read information and the image bio information to the arrival and entrance examination system 160 (S302). If the passport of the transfer passenger is an electronic passport, the transfer automation apparatus 330 may read the electronic passport and generate bio read information, and the bio read information may be transmitted to the transfer management portion 340 and the immigration system 160.

The immigration system 160 compares the identity read information received from the transfer management portion 340 and advance passenger information system (APIS) information received from the airline system 150 and generates information about a transfer examination result. Also, the immigration system 160 registers the image bio information or the bio read information of the transfer passenger on a DB.

The transfer management portion 340 receives the information about the transfer examination result and the registration of the identity information and the image bio information of a transfer passenger from the immigration system 160 (S303).

The transfer automation apparatus 330 checks whether the transfer passenger has any carry-on items prohibited on the plane, and transmits check result information to the transfer management portion 340 (S304).

The transfer management portion 340 determines whether the identity read information and the image bio information are registered and the transfer passenger may enter the transfer area as a result of the transfer examination (S305). If the transfer passenger is allowed to enter the transfer area, the transfer management portion 340 opens the exit gate 110 (S306).

Otherwise, if the transfer passenger is not allowed to enter the transfer area, the transfer management portion 340 generates an abnormal signal (S307), and informs a staff member who is responsible for the transfer area of the generation of an abnormal signal. The guidance output portion of the transfer automation apparatus 230 may provide, by video and/or audio, guide information about actions to perform for each procedure and information about the result of each procedure to the transfer passenger.

Figure 12:
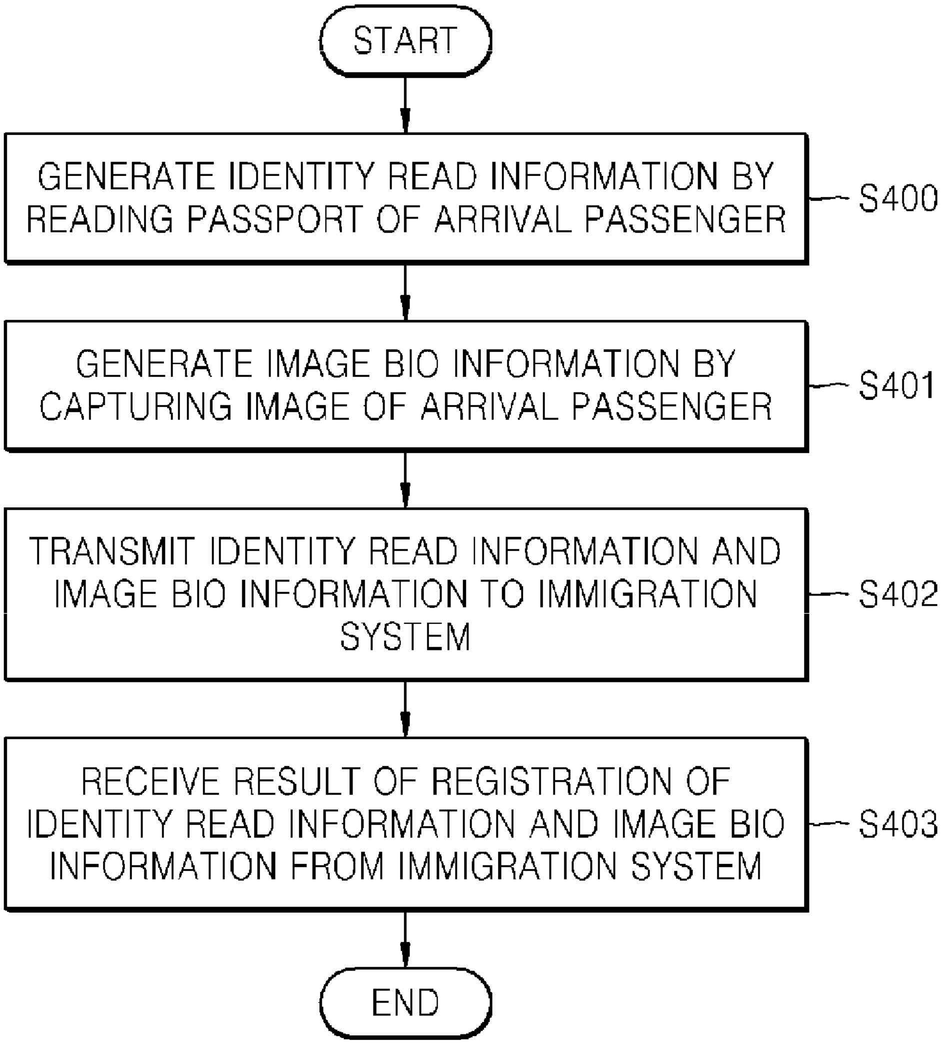
FIG. 12 is a flowchart for explaining a method of automating arrival and departure procedures, according to another embodiment of the present invention.

FIG. 12 is a flowchart for explaining a method of automating arrival and departure procedures, according to another embodiment of the present invention. FIG. 12 illustrates a method of performing a security procedure on an arriving passenger in an arrival area during the arrival and departure procedure.

Referring to FIG. 12, the arrival automation apparatus 430 reads a passport of the arriving passenger to generate identity read information (S400), checks the forgery of the passport, and captures an image of the passport bearer to generate image bio information (S401).

The arrival management portion 440 receives the identity read information and image bio information from the arrival automation apparatus 430 and transmits the identity read information and the image bio information to the immigration system 160 (S402). If the passport of the arriving passenger is an electronic passport, the arrival automation apparatus 430 may read the electronic passport to generate bio read information of the arriving passenger. The bio read information of the arriving passenger may be transmitted to the arrival management portion 440 and the immigration system 160.

The immigration system 160 compares the identity read information received from the arrival management portion 440 and APIS information received from the airline system 150 and generates arrival examination result information. Also, the immigration system 160 registers the identity read information, the image bio information, and/or the bio read information of the arriving passenger on a DB.

The arrival management portion 440 receives information about the arrival examination result and information about the registration of the identity read information and the image bio information of the arriving passenger from the immigration system 160. The arrival automation apparatus 430 may provide, by video and/or audio, guide information about actions to perform for each procedure and information about the result of each procedure to the arriving passenger.

As described above, according to the present invention, since an electronic passport bearer can be easily identified by using bio information stored in the electronic passport, the arrival and departure examination may be efficiently conducted. Also, an illegal activity in an airport such as passport/boarding pass switching may be stopped. Since various security procedures for arrival and departure are automated, the manpower and time needed for the security procedure may be reduced. Furthermore, since a boarding pass is unnecessary for the arrival and departure examination procedure, the convenience and satisfaction of airport users may be improved.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. An apparatus for automating arrival and departure procedures for controlling a bearer of an electronic passport to undergo a security procedure when passing a path, the apparatus comprising:

an entrance gate installed at an entrance of the path;

a scanner installed at the entrance gate and controlling opening of the entrance gate by reading identity information recorded in a machine readable passport zone (MRZ) of the electronic passport;

an exit gate installed at an exit of the path;

a departure automation apparatus installed beside the path and generating identity read information and bio read information by reading a non-contact IC chip of the electronic passport in which identity information and bio information including a face image of the bearer of the electronic passport are stored, generating image bio information by capturing an image of the face of the bearer of the electronic passport, and generating first result information about forgery of the electronic passport by comparing the identity information recorded in the MRZ with the identity read information;

a security screening device installed beside the path and performing a security screening on the bearer of the electronic passport and generating check result information about whether the bearer of the electronic passport has a carry-on item prohibited on a plane;

a departure management portion generating second result information about check-in of the electronic passport bearer by comparing the identity read information and check-in information received from an airline system, generating third result information about the identity of the electronic passport bearer by comparing the bio read information and the image bio information, transmitting the identity read information to an immigration system, and receiving from the immigration system fourth result information about a departure examination result determined based on the identity read information, wherein, when the bearer of the electronic passport passes all security procedures according to the first to fourth result information and the check result information, the departure management portion opens the exit gate only, wherein, when the bearer of the electronic passport fails to pass any one of the security procedures according to the first to fourth result information and the check result information, the departure management portion opens the entrance gate only, wherein, when the bearer of the electronic passport passes through the entrance gate, other persons do not pass through the entrance gate until the bearer of the electronic passport exits from the path.

2. The apparatus of either claim 1, further comprising a guidance output portion guiding the bearer of the electronic passport on an action that the bearer of the electronic passport is to perform using video and/or audio.

3. The apparatus of either claim 1, wherein the path is a space segregated from the outside by a pair of partition walls that are a predetermined distance apart facing each other.

4. The apparatus of either claim 1, wherein the bio information stored in the electronic passport further comprises at least one of a fingerprint image and an iris image of the bearer of the electronic passport, the departure automation apparatus further captures at least one of the fingerprint image and the iris image of the bearer of the electronic passport, and the bio read information further comprises at least one of the fingerprint image and the iris image.

5. The apparatus of claim 1, wherein each of the entrance gate, the exit gate, and the departure automation apparatus is provided in a plural number and the departure management portion controls each of the entrance gates, the exit gates, and the departure automation apparatuses.

6. A method of automating arrival and departure procedures for controlling a bearer of an electronic passport to undergo a security procedure when passing a path, the method comprising:

opening an entrance gate installed at an entrance of the path when identity information recorded in a machine readable passport zone (MRZ) of the electronic passport is read by a scanner installed at the entrance of the path generating identity read information and bio read information by reading the electronic passport in which bio information including a face image of an electronic passport owner and identity information of the electronic passport owner are stored; generating image bio information by capturing a face image of the bearer of the electronic passport;

generating first result information about forgery of the electronic passport by determining whether the electronic passport is forged;

generating check result information about whether the bearer of the electronic passport has carry-on items prohibited on a plane, by checking the bearer of the electronic passport;

generating second result information about check-in of the bearer of the electronic passport by comparing the identity read information and check-in information received from an airline system; generating third result information about the identity of the bearer of the electronic passport by comparing the bio read information and the image bio information;

transmitting the identity read information to an immigration system, and receiving from the immigration system fourth result information about a departure examination result determined based on the identity read information;

analyzing the first to fourth result information and the check result information, and opening only an exit gate installed at an exit of the path if the bearer of the electronic passport passes all security procedures according to the first to fourth result information and the check result information; and analyzing the first to fourth result information and the check result information, and opening only the entrance gate if the bearer of the electronic passport fails to any one of the security procedures according to the first to fourth result information and the check result information, wherein, when the bearer of the electronic passport passes through the entrance gate, other persons do not pass through the entrance gate until the bearer of the electronic passport exit from the path.

7. The method of claim 6, further comprising guiding the bearer of the electronic passport on an action that the bearer of the electronic passport is to perform using video and/or audio.

8. The method of claim 6, wherein the bio information stored in the electronic passport further comprises at least one of a fingerprint image and an iris image of the bearer of the electronic passport, at least one of the fingerprint image and the iris image of the bearer of the electronic passport is further captured in the generating of image bio information by capturing a face image of the bearer of the electronic passport, and the bio read information further comprises at least one of the fingerprint image and the iris image.

* * * * *